United States Patent
Sugla

(10) Patent No.: US 7,904,244 B2
(45) Date of Patent: Mar. 8, 2011

(54) DETERMINING A LOCATION OR POSITION USING INFORMATION FROM MULTIPLE LOCATION AND POSITIONING TECHNOLOGIES AND APPLICATIONS USING SUCH A DETERMINED LOCATION OR POSITION

(75) Inventor: Binay Sugla, Aberdeen, NJ (US)

(73) Assignee: Sarimo Technologies, LLC, Red Bank, NJ (US)

( * ) Notice: Subject to any disclaimer, the term of this patent is extended or adjusted under 35 U.S.C. 154(b) by 1194 days.

(21) Appl. No.: 10/990,638

(22) Filed: Nov. 17, 2004

(65) Prior Publication Data
US 2005/0107953 A1    May 19, 2005

Related U.S. Application Data

(60) Provisional application No. 60/520,846, filed on Nov. 18, 2003.

(51) Int. Cl.
  G05D 1/02 (2006.01)
  G06G 7/78 (2006.01)
(52) U.S. Cl. ............ 701/300; 701/301; 701/224; 725/63; 725/76; 342/457; 342/451; 455/456.1
(58) Field of Classification Search .................. 701/200, 701/224, 300–301; 455/456.1; 342/357.09, 342/450, 453, 357.01, 454, 457, 451; 340/539.1; 725/76, 63–64
See application file for complete search history.

(56) References Cited

U.S. PATENT DOCUMENTS

| | | | |
|---|---|---|---|
| 6,249,252 B1 * | 6/2001 | Dupray | 342/450 |
| 6,442,487 B2 * | 8/2002 | Kim | 702/6 |
| 6,708,109 B1 * | 3/2004 | Pradhan et al. | 701/207 |
| 7,089,452 B2 * | 8/2006 | Rubin et al. | 714/32 |
| 7,209,752 B2 * | 4/2007 | Myllymaki et al. | 455/456.1 |
| 7,274,332 B1 * | 9/2007 | Dupray | 342/450 |
| 7,486,229 B1 * | 2/2009 | Govoni | 342/165 |
| 7,525,484 B2 * | 4/2009 | Dupray et al. | 342/450 |

(Continued)

FOREIGN PATENT DOCUMENTS

CN       1955941 A  *  5/2007

(Continued)

OTHER PUBLICATIONS

Brignone et al., Mobile telephone for physical object navigation, adjusts field of vision of beacon receiver based on current position, and compensates heading direction and positionvariance of device, DERWENT-ACC-No. 2004-313459, May 16, 2004.*

(Continued)

*Primary Examiner* — Cuong H Nguyen
(74) *Attorney, Agent, or Firm* — Straub & Pokotylo; John C. Pokotylo

(57) ABSTRACT

A location may be determined by accepting location information from at least two sources using at least two location technologies, for each set of location information from each source, adjusting the location information using at least one of (A) confidence in the source, (B) error range of the source, (C) an error model for the source, and (D) application-specific context information, and combining adjusted locations to generate a final location these location technologies assume a degree of cooperation. The location technologies may include a combination of a "tag" that is placed on the object to be tracked, and one or more receivers/transmitters that work in concert with the tag to locate the object.

5 Claims, 9 Drawing Sheets

U.S. PATENT DOCUMENTS

| | | | |
|---|---|---|---|
| 2002/0144272 A1* | 10/2002 | McLain et al. | 725/76 |
| 2003/0209893 A1* | 11/2003 | Breed et al. | 280/735 |
| 2004/0017312 A1* | 1/2004 | Anderson et al. | 342/457 |
| 2004/0127228 A1* | 7/2004 | You et al. | 455/456.1 |
| 2005/0015680 A1* | 1/2005 | Rubin et al. | 714/47 |
| 2005/0107953 A1* | 5/2005 | Sugla | 701/300 |
| 2005/0131635 A1* | 6/2005 | Myllymaki et al. | 701/205 |
| 2005/0270236 A1* | 12/2005 | Krumm et al. | 342/451 |
| 2007/0001867 A1* | 1/2007 | Rowe et al. | 340/825.49 |
| 2007/0101213 A1* | 5/2007 | Seger | 714/712 |
| 2007/0192013 A1* | 8/2007 | Bando et al. | 701/93 |
| 2008/0042901 A1* | 2/2008 | Smith et al. | 342/464 |
| 2008/0048914 A1* | 2/2008 | Smith et al. | 342/464 |
| 2009/0005987 A1* | 1/2009 | Vengroff et al. | 701/300 |

FOREIGN PATENT DOCUMENTS

| | | | |
|---|---|---|---|
| CN | 101297487 A | * | 10/2008 |
| CN | 101466146 A | * | 6/2009 |
| EP | 1532464 A1 | * | 5/2005 |
| FI | 113092 B1 | * | 2/2004 |
| JP | 2000293784 A | * | 10/2000 |
| JP | 2007203860 A | * | 8/2007 |
| WO | WO 03102620 A1 | * | 12/2003 |
| WO | WO 2007048703 A1 | * | 5/2007 |

OTHER PUBLICATIONS

Dynamic Testing of GPS Receivers on Agricultural Aircraft for Remote Sensing and Variable-Rate Aerial Application,Thomson, S.J.; Smith, L.A.; Position, Location, And Navigation Symposium, 2006 IEEE/ION, Apr. 25-27, 2006 pp. 1067-1070.*

Novel self-configurable positioning technique for multihop wireless networks, Hongyi Wu; Chong Wang; Nian-Feng Tzeng; Networking, IEEE/ACM Transactions on, vol. 13, Issue 3, Jun. 2005 pp. 609-621, Digital Object Identifier 10.1109/TNET.2005.850202.*

Query indexing and velocity constrained indexing: scalable techniques for continuous queries on moving objects Prabhakar, S.; Yuni Xia; Kalashnikov, D.V.; Aref, W.G.; Hambrusch, S.E.; Computers, IEEE Transactions on, vol. 51, Issue 10, Oct. 2002 pp. 1124-1140, Digital Object Identifier 10.1109/TC.2002.1039840.*

Position estimation using ultra-wideband time difference of arrival measurements; Xu, J.; Ma, M.; Law, C.L.; Science, Measurement & Technology, IET, vol. 2, Issue 1, Jan. 2008 pp. 53-58; Digital Object Identifier 10.1049/iet-smt:20060089.*

Relaying and Power Control Strategy for 2-Hop Distributed Cooperative Communication; Kurniawan, E.; Madhukumar, A.S.; Chin, F.; Vehicular Technology Conference, 2008. VTC Spring 2008. IEEE, May 11-14, 2008 pp. 98-102; Digital Object Identifier 10.1109/VETECS.2008.33.*

GALE: An Enhanced Geometry-Assisted Location Estimation Algorithm for NLOS Environments; Kai-Ten Feng; Chao-Lin Chen; Chien-Hua Chen; Mobile Computing, IEEE Transactions on, vol. 7, Issue 2, Feb. 2008 pp. 199-213; Digital Object Identifier 10.1109/TMC.2007.70721.*

Indoor Localization Using Multiple Wireless Technologies; Mahtab Hossain, A.K.M.; Hien Nguyen Van; Yunye Jin; Wee-Seng Soh; Mobile Adhoc and Sensor Systems, 2007. MASS 2007. IEEE Internatonal Conference on; Oct. 8-11, 2007 pp. 1-8 Digital Object Identifier 10.1109/MOBHOC.2007.4428622.*

Positioning Accuracy Calculation Method of Plane Multi-pin Based on Statistic Characteristics; Xin Jin; Xin Ye; Zhi-jing Zhang; Mechatronics and Automation, 2007. ICMA 2007. International Conference on; Aug. 5-8, 2007 pp. 3046-3050 Digital Object Identifier 10.1109/ICMA.2007.4304046.*

The Discrete Probability Density Method for Emitter Geolocation; Elsaesser, D.; Electrical and Computer Engineering, 2006. CCECE '06. Canadian Conference on; May 2006 pp. 25-30; Digital Object Identifier 10.1109/CCECE.2006.277336.*

Data fusion and optimal placement of fixed and mobile sensors; Neidhardt, A.; Luss, H.; Krishnan, K.R.; Sensors Applications Symposium, 2008. SAS 2008. IEEE; Feb. 12-14, 2008 pp. 128-133.*

Driscoll, "Wireless Caller Location Systems", 1998, GSP World Advanstar Communications, Inc.,; http://www.gpsworld.com/1198/1198driscol.html, pp. 1-8 (cited by other).*

Study on earthquake losses assessment model considering the uncertainties of earthquake location and other factors Xiaoqing Wang et al.; Geoscience and Remote Sensing Symposium, 2004. IGARSS '04. Proceedings. 2004 IEEE International; vol. 4; Digital Object Identifier: 10.1109/IGARSS.2004.1369731; Publication Year: 2004, pp. 2249-2251.*

Bayesian bin distribution inference and mutual information; Endres, D.; Foldiak, P.; Information Theory, IEEE Transactions on vol. 51, Issue: 11; Digital Object Identifier: 10.1109/TIT.2005.856954; Publication Year: 2005, pp. 3766-3779.*

On the cumulative distribution function of quadratic-form receivers over generalized fading channels with tone interference Di Renzo, M.; Graziosi, F.; Santucci, F.; Communications, IEEE Transactions on; vol. 57, Issue: 7; Digital Object Identifier: 10.1109/TCOMM.2009.07.070422 ; Publication Year: 2009 , pp. 2122-2137.*

Minimum mean square error approximation of unknown probability distribution functions; Deuser, L.M.; Lainiotis, D.G.; Adaptive Processes, 1968. Seventh Symposium on; vol. 7 , Part: 1; Digital Object Identifier: 10.1109/SAP.1968.267089 Publication Year: 1968 , pp. 54-54.*

The Diversity Algorithms of Timing Synchronization for MIMO-OFDM Systems in Mobile Environments; Duan Peng et al.; Wireless Communications, Networking and Mobile Computing, 2006. WiCOM 2006.International Conference on Digital Object Identifier: 10.1109/WiCOM.2006.31; Publication Year: 2006 , pp. 1-4.*

A novel algorithms of timing synchronization for MIMO-OFDM systems; Duan Peng et al.; Wireless, Mobile and Multimedia Networks, 2006 IET International Conference on; Publication Year: 2006 , pp. 1-3.*

Error models for evaluating error control strategies in EGPRS systems; Cheng-Xiang Wang et al..; Vehicular Technology Conference, 2004. VTC2004-Fall. 2004 IEEE 60th; vol. 6; Digital Object Identifier: 10.1109/VETECF.2004.1404878 Publication Year: 2004 , pp. 4238-4244 vol. 6.*

Cross-Layer Adaptive ARQ and Modulation Tradeoffs; Kobravi, A.; Shikh-Bahaei, M.; Personal, Indoor and Mobile Radio Communications, 2007. PIMRC 2007. IEEE 18th International Symposium on; Digital Object Identifier: 10.1109/PIMRC.2007.4394411; Publication Year: 2007 , pp. 1-5.*

A New Statistical Model for the Behavior of Ranging Errors in TOA-Based Indoor Localization; Heidari, M.; Pahlavan, K.; Wireless Communications and Networking Conference, 2007.WCNC 2007. IEEE; Digital Object Identifier: 10.1109/WCNC.2007.477; Publication Year: 2007 , pp. 2564-2569.*

The Discrete Probability Density Method for Emitter Geolocation; Derek Elsaesser; Electrical and Computer Engineering, 2006. CCECE '06. Canadian Conference on ; Digital Object Identifier: 10.1109/CCECE.2006.277336 ; Publication Year: 2006 , pp. 25-30.*

Location of mobile terminals with quantized measurements; McGuire, M.; Personal, Indoor and Mobile Radio Communications, 2005. PIMRC 2005. IEEE 16th International Symposium on; vol. 3; Digital Object Identifier: 10.1109/PIMRC.2005.1651799 Publication Year: 2005 , pp. 2045-2049 vol. 3.*

Location Fingerprint Analyses Toward Efficient Indoor Positioning; Swangmuang, N.; Krishnamurthy, P.; Pervasive Computing and Communications, 2008. PerCom 2008. Sixth Annual IEEE International Conference on; Digital Object Identifier: 10.1109/PERCOM.2008.33; Publication Year: 2008 , pp. 100-109.*

* cited by examiner

DETERMINING A LOCATION OR POSITION USING INFORMATION FROM MULTIPLE LOCATION AND POSITIONING TECHNOLOGIES AND APPLICATIONS USING SUCH A DETERMINED LOCATION OR POSITION

§0. RELATED APPLICATIONS

This application claims benefit to U.S. Provisional Application Ser. No. 60/520,846, titled "METHOD OF IMPROVING LOCATION ACCURACY, ACHIEVING SEAMLESS TRACKING AND ENABLING NOVEL APPLICATIONS USING INFORMATION FROM MULTIPLE LOCAITON AND POSITIONING TECHNOLOGIES", filed on Nov. 18, 2003, and listing Binay Sugla as the inventor. That application is expressly incorporated herein by reference. The scope of the present invention is not limited to any requirements of the specific embodiments in that application.

§1. BACKGROUND OF THE INVENTION

§1.1 Field of the Invention

The present invention concerns determining a location or position. In particular, the present invention concerns avoiding problems of various individual location and positioning technologies to generate an improved location or position, as well as uses of such an improved location or position.

§1.2 Background Information

Over the last few decades, interest in locating and tracking objects has exploded. Radar and related technologies have been around for a long time. With radar, an object is tracked using electromagnetic radiation reflected by an uncooperative object. A number of location technologies have been developed including global positioning satellite (GPS), triangulation, "radio camera," angle of arrival, time of arrival, time difference of arrival and phase difference of arrival, and power signature. Each of the foregoing location technologies are designed to work under certain assumptions and satisfy a certain set of needs of the end user. Unfortunately, each of the individual location technologies has shortcomings, some of which are introduced below.

For example, radio frequency based location technologies use various licensed and unlicensed frequency bands, may require the existence of a line-of-sight path between receivers and the tracked object(s), may require the availability of battery powered (active) tags or passive tags, and may be accurate anywhere from a few inches to tens of meters. As another example, at least some of these technologies may require non-interference from other spectrum users, a willingness to manually calibrate the entire positioning area and system, and an affordability to pay for the tags whose costs range from a few cents to a few hundred dollars.

As another example, Wi-Fi, 3G and various location technologies employing sonar, radar, proximity devices that use capacity, inductance, etc., assume the presence of various wireless networking infrastructure, Some technologies such as GPS work well outdoors, but not so well indoors (because multi-path may occur due to reflections and diffractions in an indoor environment). Conversely, other technologies, such as Wi-Fi-based (IEEE 802.11) location technologies work well indoors, but not so well outdoors (because they require that a network of receivers be placed wherever the objects of interest may reside).

Line-of-sight location technologies can be affected by environment (e.g., air, rubble, metal, buildings, etc.) between receivers and an object of interest, and may require a priori knowledge of such environment. Therefore time-of-arrival based systems need to find a way to account for non-line-of-sight paths as they interfere with accurate time estimates, thereby impacting the accuracy.

In view of the foregoing limits of current individual location technologies, it would be useful to provide methods and apparatus for generating improved (e.g., more accurate, less expensive, more versatile) location determination, particularly one that works in both indoor and outdoor environments.

§2. SUMMARY OF THE INVENTION

Embodiments consistent with the present invention use location information from multiple sources of location information using different location technologies to determine a final location. At least some embodiments consistent with the present invention may use location model information (e.g., parameters, such as error and probability distribution models) in this determination. At least some embodiments consistent with the present invention may use application context information in this determination.

At least some embodiments consistent with the present invention may use the final location to:

enable object and environment safety by triggering alarms when an object moves into a unsafe area, or when an undesirable object moves into a safe area;

modify the applications and services that the located object is entitled to by virtue of its location;

correlate and associate with another object(s) whose location is determined/known and triggering a series of user specified actions; or enable a set of business rules that predict and explain the behavior of the object.

Other applications using the final location in a manner consistent with the present invention are possible.

At least some embodiments consistent with the present invention may correlate and associate particular objects with particular locations.

§3. BRIEF DESCRIPTION OF DRAWINGS

§4. DESCRIPTION OF THE INVENTION

The present invention may involve novel methods, apparatus, message formats, and/or data structures for determining a final location using location information from multiple sources of location information using different location technologies. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described In the following, exemplary embodiments consistent with the present invention are described in §4.1. Thereafter, a number of applications consistent with the present invention is provided in §4.2. Finally, some conclusions regarding the present invention are set forth in §4.3.

In the following, the terms "location" and "position" may be used interchangeably, and each term is intended to be given its broadest reasonable interpretation.

§4.1 Exemplary Embodiments

Figure 1:
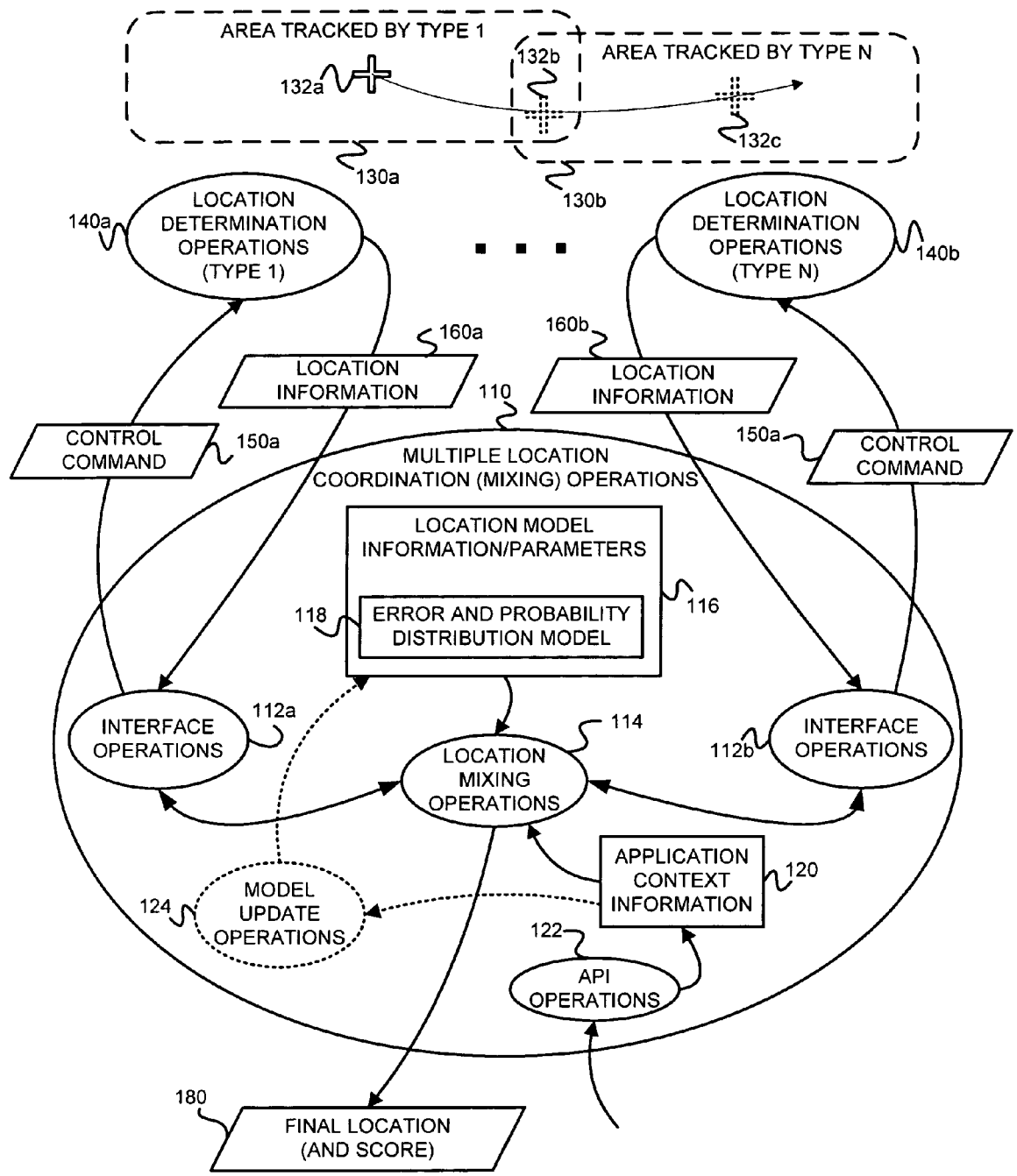
FIG. 1 is a bubble diagram of operations that may be performed, and information that may be used and/or generated, in exemplary embodiments consistent with the present invention.

FIG. 1 is a bubble diagram of operations that may be performed, and information that may be used and/or generated, in exemplary embodiments consistent with the present invention. A plurality of location determination operations 140 using various types of location technologies can cover overlapping and/or non-overlapping areas 130. Thus, an object 132 may be tracked as it moves to and from different areas 130, some of which may overlap. Multiple location coordination (e.g., mixing) operations 110 may accept location information 160 from each of at least two location determination operations 140, and may generate a final location 180. The final location 180 may include an associated score, such as a confidence or trust level for example.

Still referring to FIG. 1, multiple location coordination operations 110 may include interface operations 112, which allow location mixing operations 114 to interact with, or at least receive location information from, at least two location determination operations 140. The location mixing operations 114 may use received location information 140, as well as location model information/parameters 116 and/or application context information 120, to generate a final location 180.

The location model information/parameters 116 may include error and probability distribution models 118. For example, due to non-line-of-sight conditions, a time of arrival based system might not be able to locate the object of interest on the right floor of a multi-floor building. However, once the floor of the object is known, such a system can determine the location of the object to a higher degree of accuracy. In this example, if an RFID system was deployed between floors, it could pinpoint the floor (but not the exact location), thereby greatly increasing the accuracy of the overall system.

Application program interface (API) operations 122 may be used to load and/or modify the application context information 120. Model update operations 124 may use at least some of the application context information 120 to generate and/or modify location model information/parameters 116. The application context information 120 may include information to modify certain location information (e.g., weight such information more or less) depending on the particular application. For example, if an object is known to travel at a certain maximum speed, the last known location at a known time can be used as a reasonably good indicator of the current possible region where the object could be. Similarly, if it is known that a certain location area represents a maintenance wing and maintenance takes twelve hours, the location of the object can be predicted or narrowed for that time period.

The location mixing operations 114 may request (further) information from one or more location determination operations 140, or may control one or more such operations 140, via interface operations 112. For example, control commands 150 may include one or more of interrogating the object to determine its location, increasing the number of receivers employed in locating the object, altering the parameters of the location system to help determine the location of the object (e.g., antenna orientation of the receivers), and sending a command to a location tag attached to the object to "wake up" or increase its transmission power. Other control commands are possible.

Location determination operations 140 may include various location determination facilities such as GPS-based, WiFi-based, RF-based, proximity-based, triangulation-based, radio camera, time difference of arrival-based, phase difference of arrival based, inertial-based, doppler-based, optics-based and sonar-based.

The location information 160 may include location information in terms of latitude, longitude, altitude, on-facility (e.g., building, room, base, campus, property, etc.), off-facility, on-floor, off-floor, distance, angle, position relative to another object whose location is known, etc.). The location information may also include error range information (e.g., ±distance), confidence, time of measurement, probability distribution of location, and state of the object.

§4.1.1 Exemplary Methods

Figure 2:
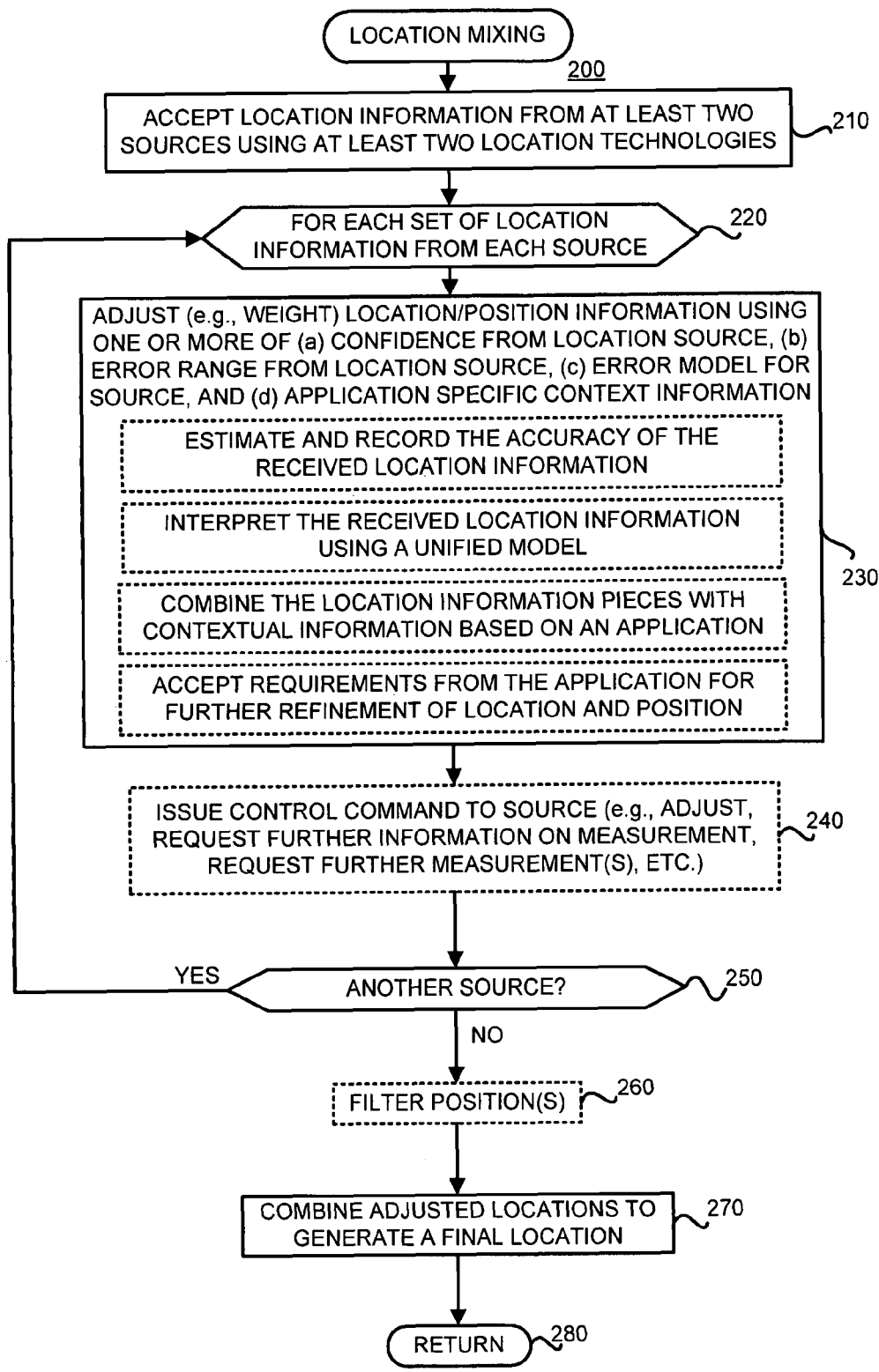
FIG. 2 is a flow diagram of an exemplary method that may be used to mix location information from at least two sources using at least two different location technologies, in a manner consistent with the present invention.

FIG. 2 is a flow diagram of an exemplary method 200 that may be used to mix location information from at least two sources using at least two different location technologies, in a manner consistent with the present invention. Location information from at least two sources using at least two location technologies is accepted. (Block 210) As indicated by loop 220-250, a number of acts may be performed for each set of location information. For example, the location information may be adjusted using one or more of (a) a confidence provided by the location information source, (b) an error range provided by the location information source, (c) error model information for the location information source, (d) application specific context information, etc. (Block 230) The method 200 may also issue one or more control commands to the location information source (e.g., adjust some baseline, adjust measurement means, request further information (e.g., accuracy, precision, time, etc.) about the measurement, request further measurements, etc.). (Block 240)

After the location information has been adjusted, some of the information may be filtered out. (Block 260) In any event, adjusted locations are combined to generate a final location (Block 270) before the method 200 is left (Node 280).

Referring back to block 230, location information may be adjusted in various ways. For example, given the probability distributions, one or more of various mathematical functions of addition, multiplication, convolution, discrete logic operations, etc., could be applied. As another example, as shown in FIG. 2, block 230 may include one or more of estimating and recording the accuracy of the received location information; interpreting the received location information using a unified model; combining the location information pieces with contextual information based on an application; and accepting requirements from the application for further refinement of location and position.

Referring back to block 260, location information may be filtered in various ways. For example, only location information above a certain probability may be accepted and a number of other thresholds could be used as well.

Referring back to block 270, location information may be combined in various ways. For example, the adjusted (e.g., weighted) locations may simply be averaged. As another example, outliers could be pruned and the mode could be selected.

§4.1.2 Exemplary Architectures

Figure 3:
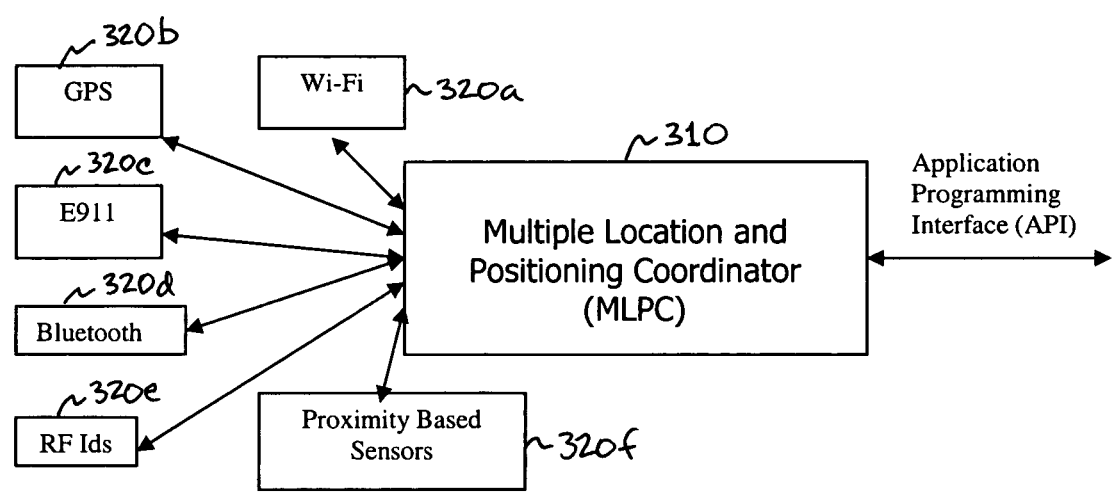
FIG. 3 is a block diagram illustrating an exemplary architecture consistent with the embodiment illustrated in FIG. 1.

FIG. 3 is a block diagram illustrating an exemplary architecture consistent with the embodiment illustrated in FIG. 1. Multiple location and positioning coordinator (MPLC) 310 interfaces with multiple location and positioning systems (e.g., Wi-Fi, GPS, E911, Bluetooth, RF IDs, and proximity-based sensors) 320 on one side and applications (not shown) on the other side. Also, note that MPLC 310 can not only receive information from systems 320, but can also communicate with them. Two way communications are also permitted between MPLC 310 and application(s). Thus, the MPLC 320 facilitates two way interactions with the multiple location and positioning systems and with the applications. Although this two way communication may not be used (and might not even be possible) with certain location and positioning systems 320, it allows for greater flexibility in querying and coordinating location and position information.

Figure 4:
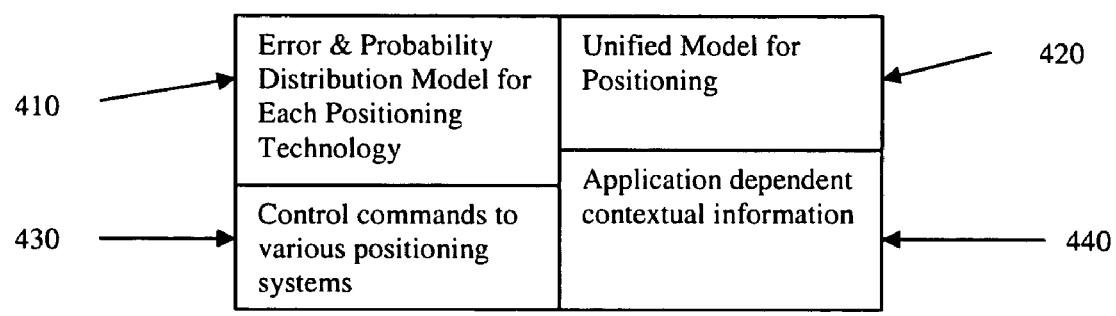
FIG. 4 is a functional block diagram illustrating exemplary modules of a mixer similar to that illustrated in FIG. 1.

FIG. 4 is a functional block diagram illustrating exemplary modules of a mixer 400 similar to that illustrated in FIG. 1. Such modules may include an error and probability distribution model for each positioning technology 410, a unified model for positioning 420, control commands to various positioning systems 430 and application dependent contextual information 440. One or more of these modules may be stored on a machine readable medium and executed by a machine, such as a general purpose computer for example. Examples of each of these modules are described below.

With regard to module 410, each location and positioning technology may have an error distribution model and position distribution model associated with it. For example, a position system may output a location as (X,Y,Z) coordinates, with an ambiguity of 5 m with probability 0.9. In general, a position system could have a series of locations with varying degrees of accuracy and probability of correctness.

With regard to module 420, the various location and positioning systems may be combined using a unified model.

With regard to module 430, using the current estimated information about position and location, control commands to various positioning systems may be issued. Such control commands may be used instruct the system(s) to either make more measurements or devote more resources to the measurements where possible. They may also be used to request additional information, or reset a baseline position for example.

With regard to module 440, based on the applications, a certain amount of contextual information may be available that helps in location and positioning. For example, if the person is known to be in a building, then position information that fixes the location outside the building may be either flagged as an anomaly or discarded.

Figure 5:
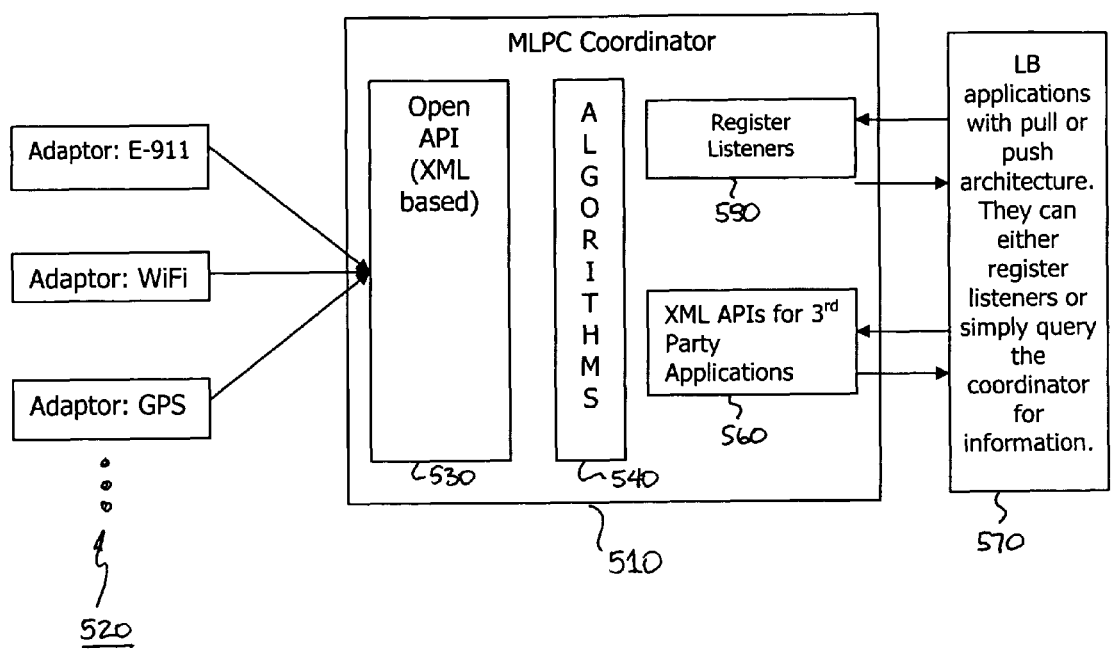
FIG. 5 is a block diagram of an exemplary software architecture consistent with the embodiment illustrated in FIG. 1.

FIG. 5 illustrates an exemplary software architecture 500 for a multiple location mixer that is consistent with the embodiment illustrated in FIG. 1. Coordinator 510 includes APIs 530, algorithms 540, register listeners 550 and/or APIs 560. APIs 530 may interface with location and position system adapters 520. Register listeners 550 and/or APIs 560 may interface with location based ("LB") applications 570.

Still referring to FIG. 5, the APIs 530 my be open and may use extensible markup language (XML), as many consortiums such as EPCglobal and RTLS are specifying interfaces.

The applications 570 may use push or pull technology. Thus, for example, they 570 can either register listeners in the case of push, or query the coordinator 510 in the case of pull. In this scenario, the location system can be designed such that objects report their location periodically and/or the system can interrogate the objects to determine their location.

§4.1.3 Exemplary Apparatus

Figure 6:
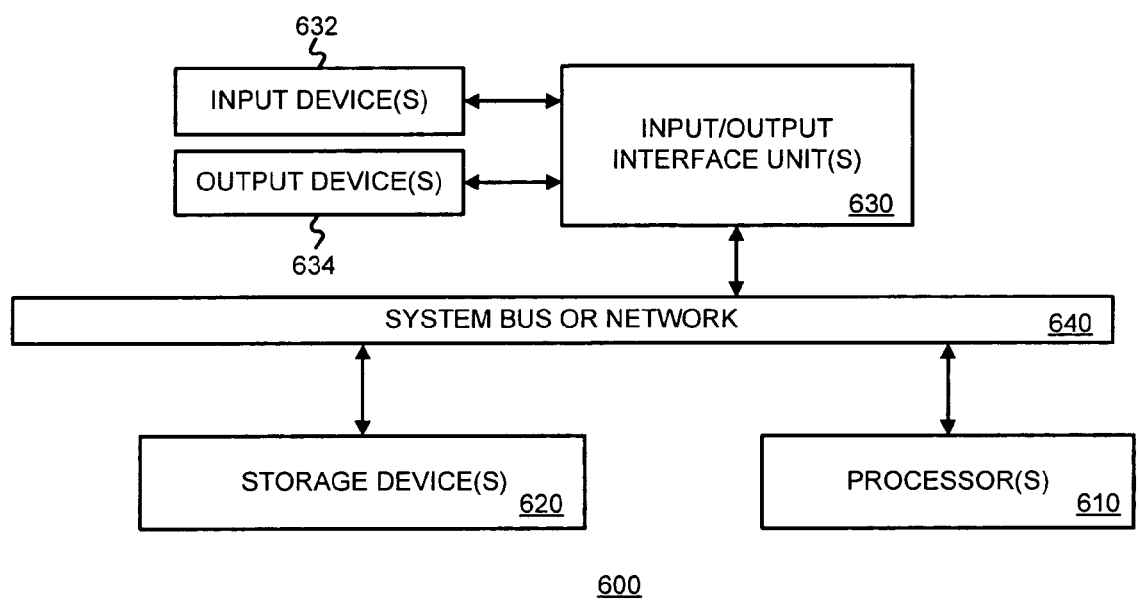
FIG. 6 is a block diagram of exemplary apparatus that may be used to perform operations and/or store information in exemplary embodiments consistent with the present invention.

FIG. 6 is high-level block diagram of a machine 600 that may perform one or more of the operations discussed above. The machine 600 includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif., the Linux operating system widely available from a number of vendors such as Red Hat, Inc. of Durham, N.C., Java, assembly, Perl, etc.) to effect one or more aspects of the present invention. At least a portion of the machine-executable instructions may be stored (temporarily or more permanently) on the one or more storage devices 620 and/or may be received from an external source via one or more input interface units 630.

In one embodiment, the machine 600 may be one or more conventional personal computers, mobile telephones, PDAs, etc. In the case of a conventional personal computer, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media, etc.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

§4.1.4 Refinements and Alternatives

One possible method of refining the components of FIG. 1 would be to provide a location tag that incorporates support for multiple location methods and encapsulating the techniques mentioned here as a new location technology.

§4.2 Exemplary Applications

Various applications may need to track one or more objects that: (i) need to be tracked with different accuracies (e.g., a small object to less than a foot, a large object within a few feet); (ii) are expensive and need to be tracked reliably thereby justifying higher costs of the tag (e.g. an expensive medical equipment costing tens of thousands of dollars justifies a $100 tag, while a book may justify a $0.10 tag); (iii) move both indoors and outdoors (e.g., a person walking in and out of a building); (iv) may move into a restricted area where certain location technologies can not be used; and/or (v) need far more accuracy that can be delivered by one technology alone, or which becomes cost prohibitive when using a single location technology.

The following includes a number of exemplary applications that can use a final location, such as that 180 of FIG. 1. The applications may provide application context information 120 which may affect how individual locations are adjusted and/or combined.

§4.2.1 Improved Accuracy E911 Service

Current approaches to E911 service typically employ either GPS or various service provider network-based techniques (e.g., triangulation from base stations, time difference of arrival, and beacon based approaches). Given the increasing prevalence of Wi-Fi like technologies, embodiments consistent with the present invention can be used to increase the accuracy of location by employing a mix of E911 and/or Wi-Fi based positioning technologies.

Figure 7:
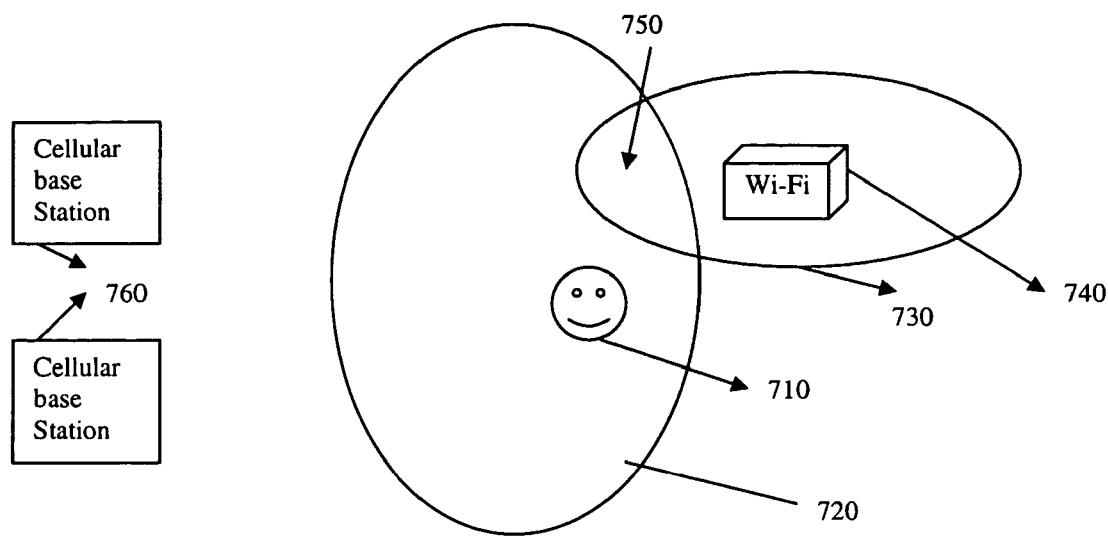
FIG. 7 illustrates an exemplary scenario for improved emergency 911 ("E911") service, both in terms of accuracy of location and cost of location.

FIG. 7 shows how the accuracy of E911 service can be improved using the MPLC combining information from E911 and Wi-Fi based location service. The person 710 being located might have either a Wi-Fi enabled cell phone or a cell phone along with Wi-Fi enabled device like a PDA or laptop. The general area of location 720 can be determined using known techniques which may use cellular base station towers 760. Area of location 730 is covered by the Wi-Fi network. The area 730 includes an access point 740 which, in a Wi-Fi network, communicates with the W-Fi enabled devices. The intersection of the location areas as determined by E911 and Wi-Fi is depicted as 750.

Embodiments consistent with the present invention may improve location determination in such a context as follows. The person with the cell phone is located and cellular area 720 is identified. The Wi-Fi device uses the W-Fi network to report his/her location area 730 to the MPLC which may be running anywhere in the network. The MPLC can then compute the person's location as being at the intersection of areas 720 and 730—namely, area 750.

The present invention may be used in the context of an environment like that of FIG. 7 to reduce the cost of location determination. More specifically, increasing the accuracy of E911 entails making expensive modifications to a multi-billion dollar infrastructure. For Phase II of E911 as mandated by FCC, carriers are planning on spending billions of dollars to improve location determination accuracy. Use of Wi-Fi based location determination in concert with existing location determination techniques could substantially reduce the cost of meeting the FCC mandate for these carriers.

§4.2.2 Achieving Seamless Location and Positioning

Figure 8:
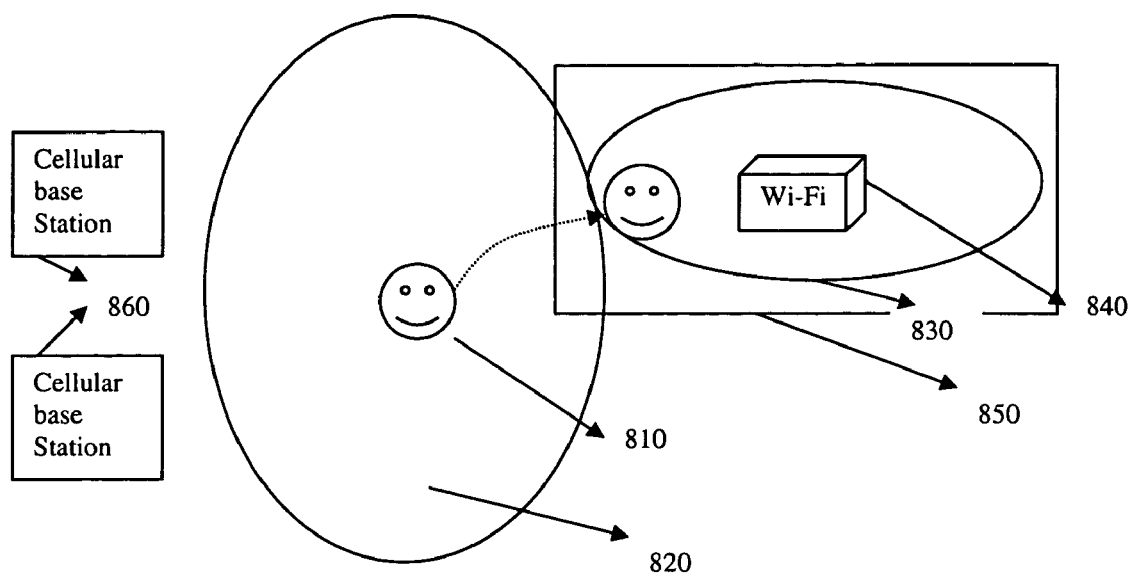
FIG. 8 illustrates an exemplary scenario in which seamless tracking is obtained.

Embodiments consistent with the present invention may be used to enable seamless location and positioning, such as in instances where an object of interest moves from one coverage area to another, and/or in instances where one location determination system falters while another is still available. FIG. 8 illustrates an exemplary scenario in which seamless tracking is obtained.

In FIG. 8, 850 represents a building where E-911 technologies like triangulation (see cellular base stations 860), or even GPS may fail to work (because these technologies presently require line of sight to function). In this example, embodiments consistent with the present invention may provide a continuous tracking of the person 810 as they enter the building 850 from the outdoors 820. For example, an exemplary procedure consistent with the present invention may operate as follows:

The person 810 is located initially by the cellular base stations 860, and this location may be reported to MLPC. Using the location information, MLPC may query the building 850 and the Wi-Fi networks in the surrounding area. When the person 810 enters the building 850, the location tracking by the cellular base stations 860 ceases, and a message may be sent to the MLPC. The MLPC may then interrogate the Wi-Fi networks and determine if a media access control (MAC) ID corresponding to the person 810 has been identified. The Wi-Fi network or the positioning server 840 corresponding to the Wi-Fi network can then report to the MLPC that the person 810 has been identified. The MLPC can now use the location information from the Wi-Fi network to continuously track person 810 while they are inside the building.

As can be appreciated from this example, locations from multiple technologies can be used continuously. Alternatively, a "handoff" from one location technology to another may occur. This handoff may occur instantaneously, or gradually, by changing weights of the different technologies. For example, initially, the cellular location may be give a weight of 1, while the Wi-Fi location may be unavailable (or given a weight of 0). The weights can transition instantaneously (e.g., from 0 to 1, and 1 to 0), or more gradually, depending on the scenario.

§4.2.3 Correlation and Association Examples

Embodiments consistent with the present invention may support a number of applications using the function of correlation and association made possible by use of location of multiple objects. Two applications of an exemplary wireless perimeter security service using correlation and association are described below. The first application, described in §4.2.3.1 below, applies to a wireless perimeter problem where it is desired to affect the privileges of a wireless device and person if the wireless device is within or outside certain geographical area. The second application, described in §4.2.3.2 below, relates to the tracking of potential criminals by security agencies using association capabilities provided by embodiments consistent with the present invention.

§4.2.3.1 Wireless Perimeter

A number of previous approaches have proposed to provide wireless perimeter security. Such approaches use location information based on one system using one particular location technology. The previous approaches have flaws and weaknesses which can easily allow a person to fool the location system. For example, more efficient and powerful antennas on the location tags can cause power signature-based location systems, which use strength of signal to determine location, to determine location incorrectly. Similarly, multipath reflections can cause the angle of arrivals to be misread in systems that use angle of arrival to determine location. In this example, embodiments consistent with the present invention may provide improved wireless perimeter security as follows.

Assume that a wireless device is assigned to one person, and can be used only within a particular building. An example of this is wireless devices used by stock traders inside a stock exchange, where traders are not allowed to use the wireless devices outside of the trading floor. The location of the trader may be tracked independently of the wireless device (e.g., via use of RF IDs, and/or proximity devices, and/or a badge which needs to be swiped every time the trader leaves or enters the building). The location of the wireless device may be tracked using an indoor location and positioning system (e.g., based on Wi-Fi or any other kind of wireless sensors). Thus, the position of a trader and their wireless device can be independently tracked.

The wireless device can be used to conduct trades only if the locations of the trader and the wireless device are consistent and inside the building. Otherwise, the privileges of the wireless device are turned off. Such enabling or disabling of devices and/or device functionality may be application specific policies (e.g., business rules).

§4.2.3.2 Tracking Criminal Activity

Figure 9:
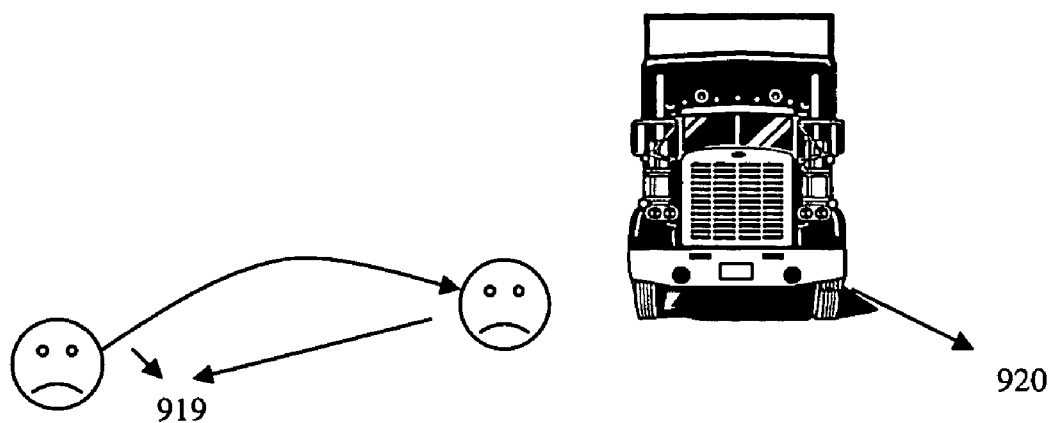
FIG. 9 illustrates an exemplary security service using correlation and association.

FIG. 9 illustrates an exemplary security service using correlation and association. In this service, policy rules specify that an alarm is to be triggered when an alleged criminal 910 approaches or is about to board the vehicle or plane 920. The individual 910 may be tracked by a RF ID (or by any other location and positioning system), and the location may be reported to MLPC. Vehicle 920 is tracked by GPS (or any other location and positioning system) and may be reported to MLPC. Once the location of the individual 910 and the vehicle 920 are close enough (as specified by the application policy), MLPC can trigger an alarm.

§4.3 Conclusions

As can be appreciated from the foregoing, embodiments consistent with the present invention may deliver one or more of the following advantages: (i) helping to locate objects more accurately and reliably than any single location system; (ii) able to work both indoors and outdoors; (iii) able to workaround spectrum or other restrictions in the environment; (iv) able to intelligently incorporate state (application) information to determine past and present locations, and/or to predict future locations; (v) able to correlate and associate the location information of one or more objects to trigger events; and (vi) enables various safety, security and/or other enterprise policies.

What is claimed is:

1. A computer-readable storage device storing computer-executable instructions which, when executed by a machine, perform a method comprising:
   a) receiving multiple pieces of location information for an item, the received multiple pieces of location information being sourced from multiple different location systems using different types of location technologies;
   b) receiving application-specific context information;
   c) receiving information for interpreting an accuracy of each of the received multiple pieces of location information based on the type of location technology used by the respective location system from which the piece of location information was sourced;
   d) combining the received multiple pieces of location information using both (1) the received application-specific context information and (2) the received information for interpreting an accuracy of each of the received multiple pieces of location information, in accordance with a unified model which combines error and probability distribution models for each of the different types of the location systems, to generate a refined location estimate for the item;
   e) accepting application-specific requirements for further refinement of a location for the item; and
   f) sending instructions to direct or configure at least one of the multiple different location systems to provide additional location information.

2. The computer-readable storage medium of claim 1 wherein the multiple pieces of location information are multiple indoor location information corresponding to various different indoor location systems.

3. A computer-implemented method comprising:
   a) receiving multiple pieces of location information for an item, the received multiple pieces of location information being sourced from multiple different location systems using different types of location technologies ;
   b) receiving application-specific context information;
   c) receiving information for interpreting an accuracy of each of the received multiple pieces of location information based on the type of location technology used by the respective location system from which the piece of location information was sourced;
   d) combining the received multiple pieces of location information using both (1) the received application-specific context information and (2) the received information for interpreting an accuracy of each of the received multiple pieces of location information, in accordance with a unified model which combines error and probability distribution models for each of the different types of the location systems, to generate a refined location estimate for the item;
   e) accepting application-specific requirements for further refinement of a location for the item; and
   f) sending instructions to direct or configure at least one of the multiple different location systems to provide additional location information.

4. The computer-implemented method of claim 3 wherein the multiple pieces of location information are multiple indoor location information corresponding to various different indoor location systems.

5. Apparatus for determining a location using location information from multiple location systems of different types, the apparatus comprising:
   a) means for accepting multiple location information corresponding to various different location and positioning systems for one or more devices;
   b) means for estimating and recording the accuracy of the received location information;
   c) means for interpreting the received location information using a unified model;
   d) means for combining the location information pieces with contextual information based on an application;
   e) means for accepting requirements from the application for further refinement of location and position; and
   f) means for directing and configuring the various location and positioning systems to carry out further actions to locate the desired target object.

* * * * *